July 3, 1962 M. R. KUEHNLE ETAL 3,042,201

DATA PROCESSING

Filed Sept. 29, 1959 15 Sheets-Sheet 1

INVENTORS
MANFRED R. KUEHNLE
BY VICTOR F. WILSON
HEINZ M. ZEUTSCHEL
Joseph Weingarten, Atty.

DATA PROCESSING

Filed Sept. 29, 1959

15 Sheets-Sheet 2

INVENTORS

MANFRED R. KUEHNLE
BY VICTOR F. WILSON
HEINZ M. ZEUTSCHEL

Joseph Weingarten, Atty.

July 3, 1962 M. R. KUEHNLE ETAL 3,042,201

DATA PROCESSING

Filed Sept. 29, 1959 15 Sheets-Sheet 3

INVENTORS
MANFRED R. KUEHNLE
BY VICTOR F. WILSON
HEINZ M. ZEUTSCHEL
Joseph Weingarten, Atty

DATA PROCESSING

Filed Sept. 29, 1959

INVENTORS
MANFRED R. KUEHNLE
BY VICTOR F. WILSON
HEINZ M. ZEUTSCHEL
Joseph Weingarten, Atty.

July 3, 1962 M. R. KUEHNLE ETAL 3,042,201

DATA PROCESSING

Filed Sept. 29, 1959 15 Sheets-Sheet 5

INVENTORS
MANFRED R. KUEHNLE
VICTOR F. WILSON
BY HEINZ M. ZEUTSCHEL
Joseph Weingarten, Atty July 3, 1962 M. R. KUEHNLE ET AL 3,042,201

DATA PROCESSING

Filed Sept. 29, 1959 15 Sheets-Sheet 6

INVENTORS
MANFRED R. KUEHNLE
VICTOR F. WILSON
HEINZ M. ZEUTSCHEL
BY Joseph Weingarten, Atty July 3, 1962 M. R. KUEHNLE ETAL 3,042,201

DATA PROCESSING

Filed Sept. 29, 1959 15 Sheets-Sheet 7

INVENTORS
MANFRED R. KUEHNLE
VICTOR F. WILSON
HEINZ M. ZEUTSCHEL
BY Joseph Weingarten, Atty.

INVENTORS
MANFRED R. KUEHNLE
BY VICTOR F. WILSON
HEINZ M. ZEUTSCHEL
Joseph Weingarten Atty INVENTORS
MANFRED R. KUEHNLE
VICTOR F. WILSON
HEINZ M. ZEUTSCHEL
BY
Joseph Weingarten, Atty.

DATA PROCESSING

Filed Sept. 29, 1959 15 Sheets-Sheet 10

INVENTORS
MANFRED R. KUEHNLE
VICTOR F. WILSON
HEINZ M. ZEUTSCHEL
BY
Joseph Weingarten, Atty.

INVENTORS
MANFRED R. KUEHNLE
VICTOR F. WILSON
HEINZ M. ZEUTSCHEL
BY
Joseph Weingarten, Atty.

INVENTORS
MANFRED R. KUEHNLE
VICTOR F. WILSON
HEINZ M. ZEUTSCHEL
BY Joseph Weingarten, Atty.

INVENTORS
MANFRED R. KUEHNLE
VICTOR F. WILSON
HEINZ M. ZEUTSCHEL
BY
Joseph Weingarten, Atty INVENTORS
MANFRED R. KUEHNLE
VICTOR F. WILSON
HEINZ M. ZEUTSCHEL
BY
Joseph Weingarten, Atty.

INVENTOR.
MANFRED R. KUEHNLE
VICTOR F. WILSON
HEINZ M. ZEUTSCHEL
BY Joseph Weingarten, Atty.

United States Patent Office 3,042,201
Patented July 3, 1962

3,042,201
DATA PROCESSING
Manfred R. Kuehnle, Lexington, Heinz M. Zeutschel, West Newton, and Victor F. Wilson, Waltham, Mass., assignors, by mesne assignments, to Itek Corporation, a corporation of Delaware
Filed Sept. 29, 1959, Ser. No. 843,132
21 Claims. (Cl. 209—111.5)

The present invention relates in general to data processing, and more particularly concerns apparatus and techniques for the selection and retrieval of any predetermined one of a large plurality of physically similar, but individually and distinctively encoded data bearing sheets, such as film chips.

For general background, reference is made to the copending patent application of Manfred R. Kuehnle, Serial No. 839,648, filed September 14, 1959, and assigned to the assignee of the present application. This copending application disclosed a system capable of isolating a single data bearing, coded film chip, at exceedingly high speeds, from a plurality of like chips arranged on a movable support, such as a rotary drum. More specifically, in the prior system, the outer cylindrical surface of the rotatable drum was formed with a holding rail. The chips and drum together comprised a removable magazine. Typically, each film chip was provided with a support, such as a reentrant notch in one edge thereof, sufficiently large in respect to the rail cross section to permit each chip, when secured to the rail, to slide freely and to pivot or hinge approximately 90° thereon.

The drum on which the chips were mounted could rotate in either direction; motive power being derived from a suitable motor drive mechanism. Two angularly separated air jets were arranged at the outer periphery of the cylindrical array of chips, the jets being respectively derived from a detection jet head and an isolation jet head oriented to alternately furnish independently controllable jets of air pointed at the chips from opposite directions. The two air jet heads were additionally arranged so that both could be physically withdrawn from their operating position to permit access to a selected chip.

The film chips were each individually coded, as by magnetic striping, along at least one flat surface thereon adjacent a long edge; each code being in the nature of a unique binary pattern of magnetic bits. For such magnetically coded chips, a magnetic transducer or reading head for sensing the coded edges was provided adjacent the coded edges. During drum rotation, each chip was both driven and blown past the reading head by the combined effect of the drum rotation and the force of one of the air jets.

Optical apparatus capable of limited radial displacement was associated with the drum drive, air heads and transducer for displaying or reproducing the desired information on the face of the selected chip. During chip detection and isolation, the optical apparatus was withdrawn to preclude interference with search, however, when the desired chip was isolated, the optical apparatus moved radially inward to perform its function.

In the prior system as described generally above, the selected chip remained secure on its holding rail, the optics having been arranged to engage the chip and display the information contained on the face thereof. Thus, while the desired data could be rapidly located and read or reproduced, the latter operation was necessarily performed at the expense of searching time. This limitation is particularly critical, if it is desirable to view the selected data for a considerable length of time, and also if selection is to be made for the purpose of removing the selected film chip, either for use elsewhere, or because that chip is no longer needed in the particular chip grouping.

One of the primary objects of the present invention, accordingly, is to provide apparatus which will permit the retrieval or actual removal of a particular data bearing chip after it has been effectively isolated from the others in the system.

In accordance with the principles of this invention, a magazine having a holding rail supporting a plurality of chips, as aforesaid, is driven past a reading head in a fast detection run until a signal derived from the desired chip initiates the sequence of stopping the magazine and reversing the rail direction for a comparatively slow isolation run. Because of the mass and velocity of the rail with the chips mounted thereon, the magazine cannot be stopped precisely as the desired chip passes the reading head. The isolation step serves to remove the chips covering that one which is desired.

As an aspect of this invention, the isolated, desired chip is caused to assume a position where it may be retrieved and removed for subsequent utilization.

Basically, the isolation, removal and retrieval apparatus includes a series of levers which are brought into position to engage the top edges of the chips upon the initiation of the reverse, or isolation run. Specifically, a separator, lever operating in conjunction with air from the isolation air jet head knifes into the riffled chips laying against the stop lever, blocks all but the first chip from assuming an oblique position against that lever. The stop lever then moves out of the way permitting the chip to be blown against a release lever. Finally, the single chip is permitted to pass the release lever when the latter is raised, the chip passing the reading head to fall against a trap lever which momentarily halts the chip in its arc to a second oblique position. If the separated chip is not the desired one, a sequence of cams operating the levers and trap raise the trap lever from the arcuate path of the chip and it is permitted to join the other chips at the extreme end of its arc.

This sequence continues for each of the chips which were carried beyond the reading head after the desired chip was sensed. The sequence remains the same when the desired chip is isolated except that the mechanism is stopped before the tray lever raises. At this point, a retriever arm, one of two positioned above the reading head, is moved downwardly a short distance behind the chip. It remains in this position until air is shut off to the isolation head and air is permitted to flow into the detection head, the detection air jet blowing the chip away from its position against the trap to a vertical, upstanding position against the retriever arm. When this has occurred, another retriever arm, closely adjacent to the first one, is moved down on the other side of the chip, the chip being thus grasped securely between both retriever arms. Each of these two arms is provided with a continuous belt, which together engage the chip, drawing it upwardly to the top of the apparatus while at the same time the arms themselves are translated vertically from their lowermost position to their uppermost position.

In order to retrieve the chip, the holding rail is adapted to permit the physical release of any particular chip. This is accomplished by a holding rail which conforms to the open notch at the bottom of each chip, thereby holding the chip securely during the stages immediately preceding retrieval. But the rail is also flexible and compressible transversely of its main axis. Thus, with the selected chip securely engaged by the two retriever arms, a cam or like release mechanism compresses the holding rail adjacent the located chip. This change in configuration, in turn, frees the selected chip so that the retriever arms may remove the selected chip from the rail.

With the foregoing general discussion in view, it is accordingly another object of this invention to provide a data processing system wherein an arrangement of physically similar, individually coded data bearing sheets, such as film chips, may be sequentially examined to isolate, for retrieval, that particular sheet bearing a preselected data code.

Another object of the present invention is to provide a retrieval mechanism for physcially withdrawing a selected data bearing sheet from an orderly arrangement of like sheets.

A further object of the present invention is to provide means for releasably retaining a large plurality of data bearing sheets on a holding mechanism in such manner that any one sheet may be isolated and withdrawn irrespective of its position within the aforesaid plurality.

Still another object of this invention is to provide a holding rail for retaining a large plurality of data bearing film sheets in slidable, pivotal fashion while permitting release, for withdrawal, of any one of said film sheets upon a change of configuration of the rail in the vicinity of the sheets to be released.

A further object of this invention is to provide novel apparatus for altering the configuration of a film chip retaining means to achieve the release of any one film chip thereon irrespective of the position thereof on said retaining means.

Another object of this invention is to provide a novel mechanism for withdrawing an isolated data bearing sheet from a large plurality of similar sheets, all normally being effectively secured by a common retaining means.

A still further object of this invention is to provide novel means for individually and sequentially sensing a plurality of coded data bearing film chips at a relatively slow rate, the sensing being performed in a manner which will permit either isolation or retrieval, or both, of a film chip bearing a preselected code.

Yet another object of the present invention is to provide a novel combination of data sheet selection and withdrawal means.

These and other objects and advantages of this invention will become more apparent from the following detailed specification when read in connection with the accompanying drawing illustrating a preferred embodiment in which.

Figure 7:
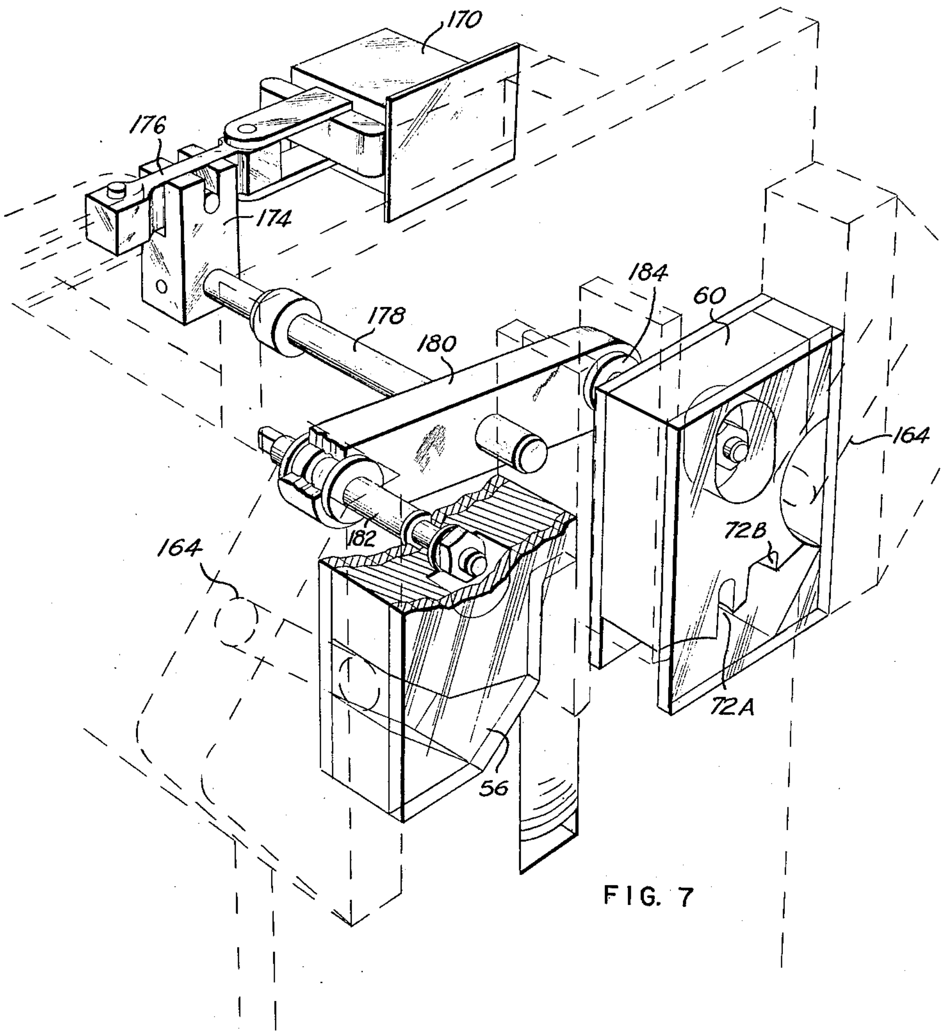
Figure 8:
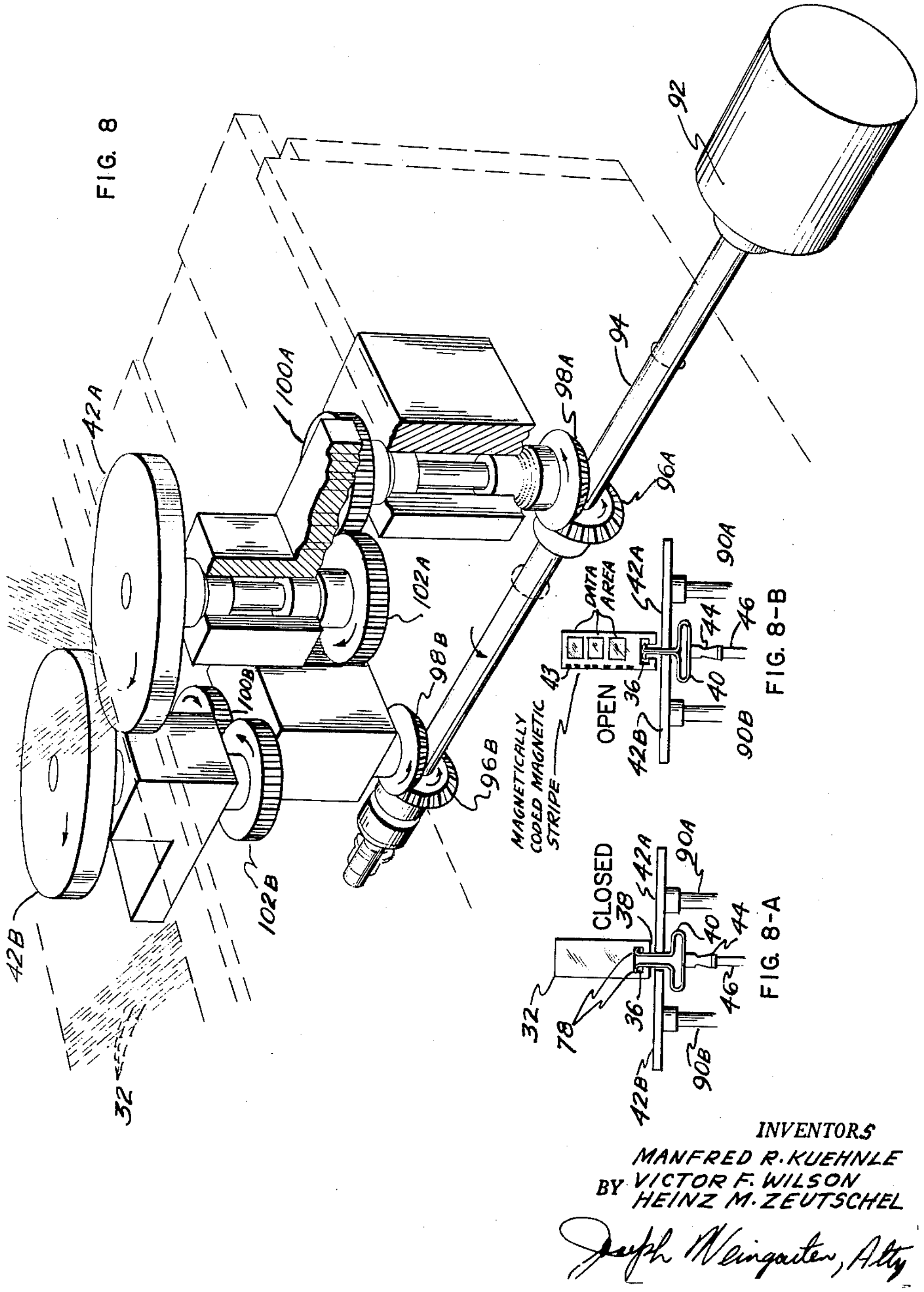
Figure 24:
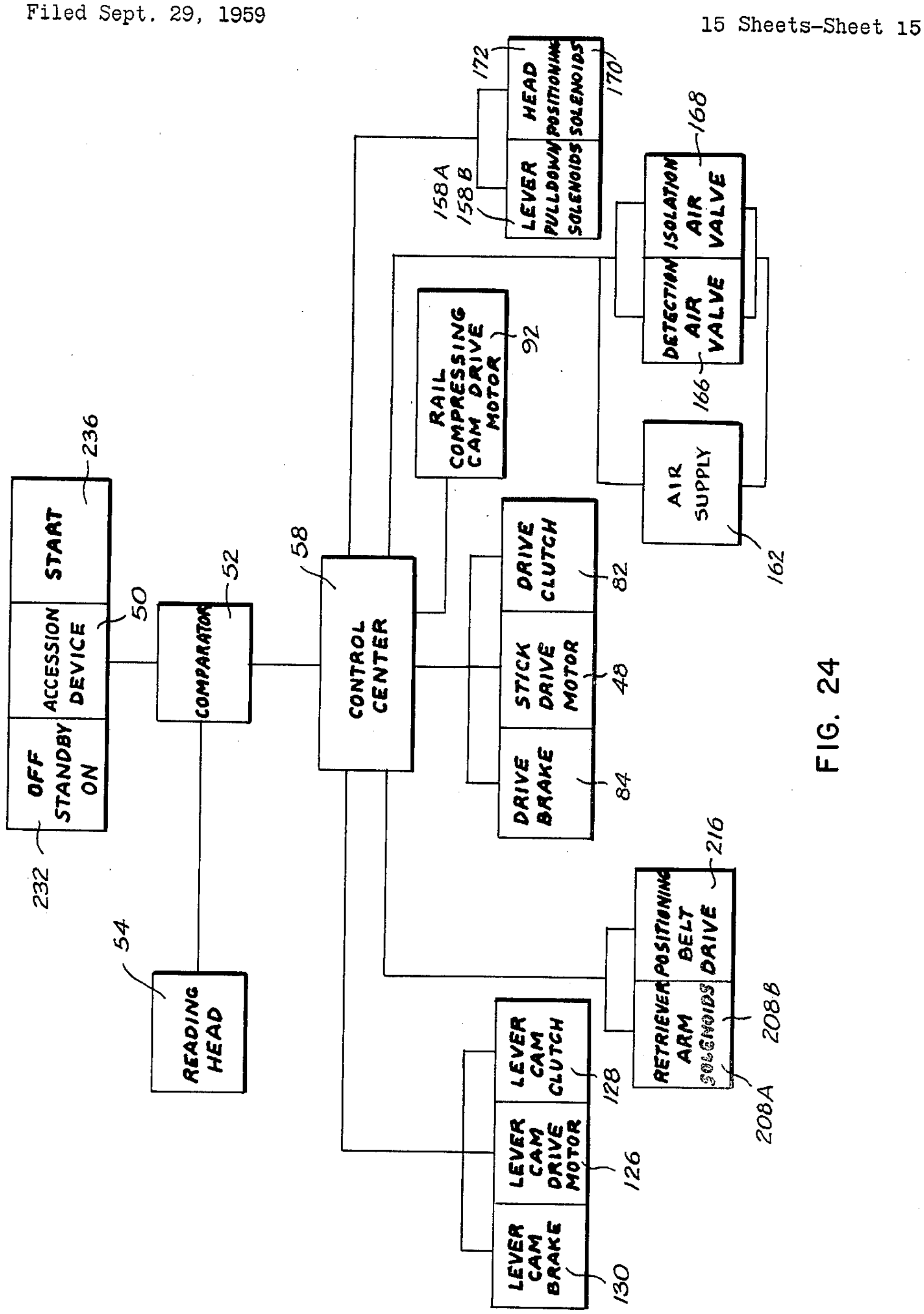

FIG. 7. shows in perspective, a detail, partly cutaway, of the mechanism for positioning the air heads;

FIG. 8 is a perspective view showing a detail of the cams and cam drive linkages which adjust the configuration of the compressible holding rail;

FIG. 8A is a diagrammatic end view of the cams in relation to the holding rail, a chip having a magnetically coded edge being held on the "closed" rail;

FIG. 8B is a view identical to that shown in FIG. 8A except that the cams have been actuated to compress or "open" the rail to permit the chip to be removed therefrom;

FIGS. 9, 10, 11, 12, 13 and 14 show in sequence the operation of the levers in relation to the chip edges during the isolation run of a film chip stick, the selected chip being designated by a heavier line than the others;

FIGS. 15, 16, 17, 18, 19, 20, 21, 22 and 23 show in sequence how the desired chip (heavy line) is caught and engaged by the various levers, engaged by retriever arms, the rail compressed, the arms and belts bringing the chip to the top of the apparatus for utilization; and FIG. 24 is a block diagram of the various elements of the complete data processing system.

*Data Handling System Generally*

The general construction and operation of the apparatus 30 of this invention is best described in conjunction with a brief summary of a data handling system using film chips. Thus, in FIG. 1, a plurality of edge coded film chips 32 are shown organized in a linear array on a "stick" or magazine generally designated by the numeral 34. The stick 34 is terminated by a pair of oblique end blocks 35, one of which may be axially slidable to accommodate the number of chips in a manner shown in FIG. 1.

As will be seen in FIGS. 8A and 8B, each chip 32 is formed with a T-shaped notch 36 in its bottom edge 38. The notches 36 permit all the chips 32 to be releasably held on a compressible holding rail 40 having a cross section which fits the notch 36. The rail 40 is shown "closed," that is, uncompressed in FIG. 8A, in FIG. 8B, cams **42*a* and 42*b* bear on each side of the rail, squeezing the two sides together to permit the chip 32** to be readily pulled off.

The film chips 32 are characterized by a stripe of magnetic material 43 on the chip surface near the edge thereof. To permit identification or detection of each chip 32, the striping 43 is given a unique code pattern as shown diagrammatically by shading and notation in FIG. 8B. As will be outlined later, a transducer means is employed with appropriate electronic circuiting to read, or sense, the code from off the edges of the chips.

Figures 2, 3:
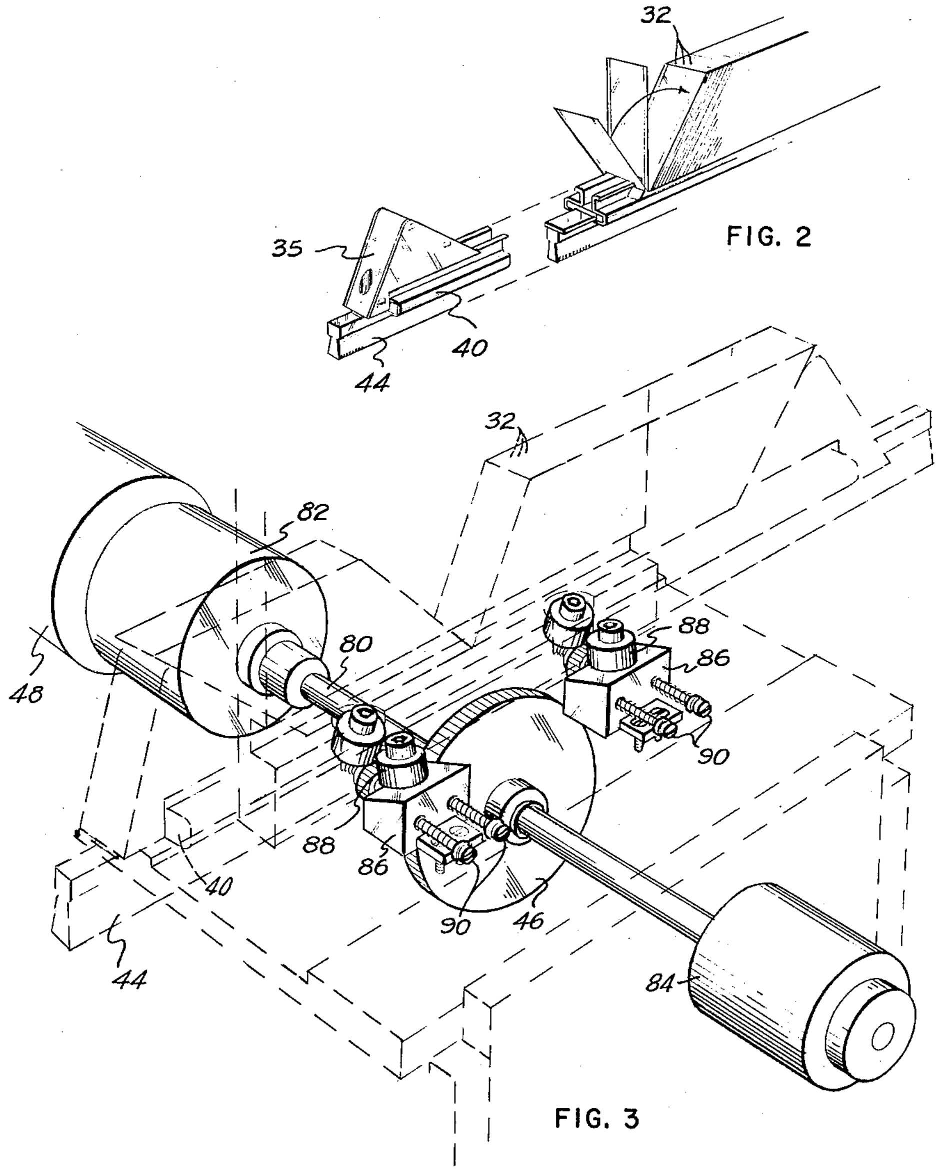
FIG. 2 is a perspective view, partially broken away, of a straight stick of film chips grouped and mounted on a compressible holding rail, the holding rail in turn being affixed to a rack member.
FIG. 3 is a perspective view of the chip rack, shown in phantom, in operative relationship with a rack traversing gear which is driven by a motor and controlled by a clutch and brake.

With the rail 40 closed, the chip notch 36 is sufficiently large to allow pivoting through approximately 90° from one oblique position to another as shown in FIG. 2. As will be seen in FIG. 3, the rail 40 is mounted on a rack 44 which is traversed by a gear 46, which in turn is driven by a motor 48.

The general nature and functional interrelationship of components in the selection system are indicated in the block diagram, FIG. 24. This figure diagrammatically illustrates a number of elements the details of which have not been further shown herein, since they form no part of the present invention. An alpha-numeric accession device 50 permits selection of a particular chip 32A (FIG. 1), converting the human readable code designation for the desired chip to a corresponding electrical signal, this signal being stored by a comparator device 52. The chip stick 34 (FIG. 2) is coursed at high speed in a detection run past a reading head 54 which senses the chip code recorded on the magnetic edge surface striping characterizing these film chips (as disclosed above and in the aforementioned patent application). A detection air jet head 56 (FIG. 9) directs a jet of air at the chips 32 in such a way as to cause only one chip at a time to piovt past the reading head 54 during the detection run.

When the reading head 54 senses the code of the desired chip 32A the comparator 52 transmits a signal to a control center 58 which initiates a sequence of control pulses. The first pulse disengages the drive motor 48 for the chip stick 34 and stops its forward motion. However, the mass of the stick 34 and its high velocity, generally do not permit instantaneous stopping of the stick so that a reverse, or isolation run is employed to select the desired chip 32A. This run is considerably slower than the forward or detection run because the overshoot, after the first control center 58 pulse, involves only a few chips, for example, twenty in a stick holding 500 or more.

Figure 9:
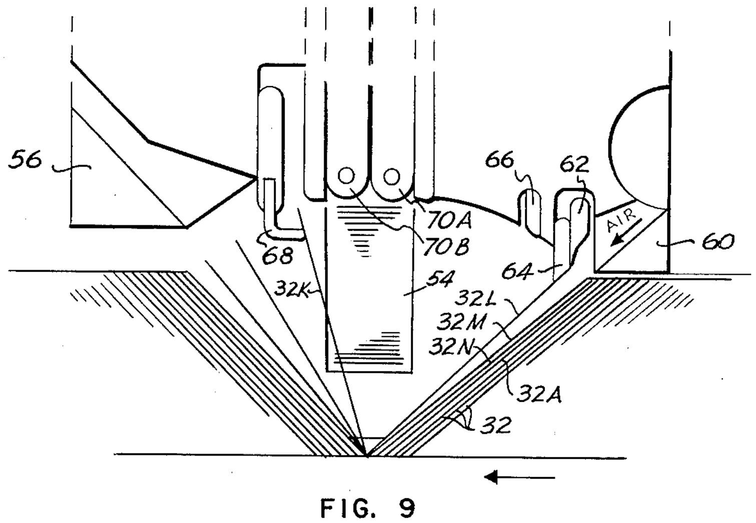

Referring now to FIGS. 24 and 9, the isolation sequence initiated by the control center 58 includes the simultaneous slow reverse run of the chip stick 34, air being supplied to an isolation air jet head 60 and the actuating of four levers, a separator lever 62, a stop lever 64, a release lever 66 and a trap lever 68. As will be described in detail below in reference to FIGS. 9–23, these levers permit only one of the chips 32 at a time to be pivoted by the isolation head 60 air jet past the reading head 54; each chip being caught momentarily by the trap lever 68 on the other side of the chip's arcuate path. If the chip 32 which passes the sensing head 54 and is momentarily caught by the trap 68 is not the desired chip, the trap is raised to permit that chip to complete its pivotal arc to its other oblique position. Each chip is comparably handled until the desired chip 32A passes the reading head.

Figure 18:
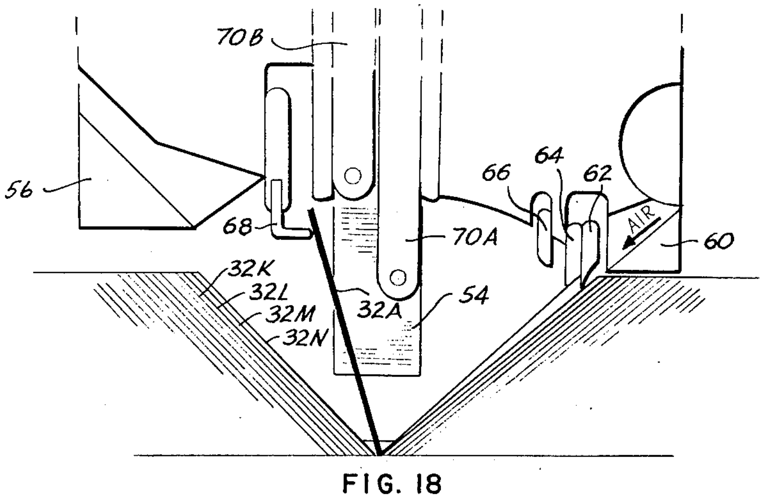
Figure 19:
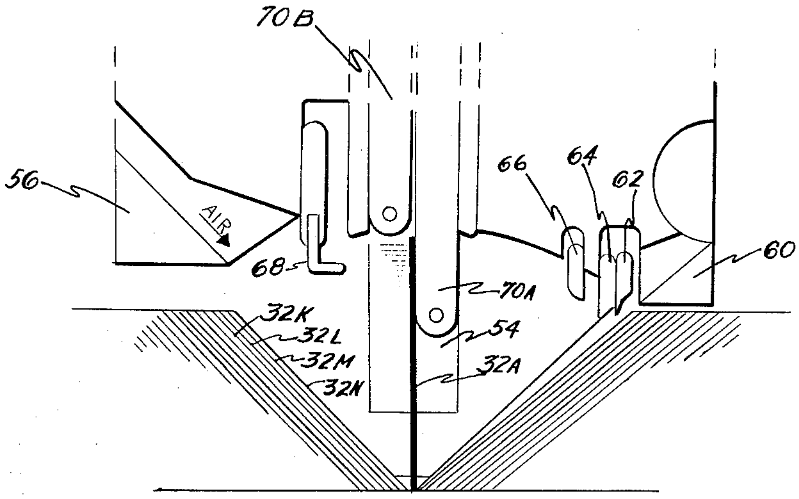

At this point, a new sequence is initiated by the control center 58 when the comparator 52 receives from the reading head 54 the electrical signal corresponding to the code designation of the particular chip 32A. As with the unwanted chips 32, the desired chip 32A is prevented from pivoting completely by the trap 68 accordingly, instead of being raised out of the way, the trap 68 is kept in place while a retriever arm 70A moves down a short distance (FIG. 18). Air supplied to the isolation head 60 is shut off and simultaneously supplied to the detection head 56. This jet blows the selected chip 32A away from the trap 68 and up against the retriever arm 70A. As the air from head 56 continues to force the chip 32A against the arm 70A, the other retriever arm 70B moves downwardly on the other side of the chip 32A to positively but gently enclose the chip.

At this point, two rail engaging cams 42A and 42B are rotated to compress the holding rail 40 just below chip 32A as indicated in FIG. 8B. When the two sides of the rail 40 are squeezed together, the two retriever arms 70A and 70B are moved upwardly together. At the same time continuous belts 74A and 74B on each of the arms 70A and 70B respectively are started in motion to carry the chip 32A up between the arms and out from between the belts at the top of the retrieval apparatus 30. Now the desired chip 32A can be removed by hand, engaged by optical apparatus (not shown) for display or reproduction, or transported elsewhere mechanically.

*Film Chips, Holding Rail and Drive*

Each of the film chips 32 as already noted, has a cutout or a notch 36 at the bottom edge 38. This notch 36 as will be seen in FIGS. 8A and 8B is T-shaped and slightly larger than the operative T-shaped cross section of the flanger 78 of the flexible or compressible holding rail 40 when uncompressed. The notch 36 is large enough to permit the chips 32 to both slide and hinge when mounted on the rail 40, but not so large as to allow the chips to fall off when the rail is uncompressed. The function of the rail 40 is actually provided by the flanger 78 being held in the notch 36 by any suitable resilient means which can be compressed to permit removal of a chip 32A. As shown in FIG. 2 the chips 32 can hinge about 90° from a first oblique position to a second oblique position.

The rail 40 is attached to a rack 44, the teeth thereof being engaged by a chip stick drive gear 46 the gear being mounted on a drive shaft 80 which is driven by the motor 48. To disengage the motor 48 rapidly, the stick drive system has an electrically actuated clutch 82; to stop the rotation of gear 46 and consequently, the motion of the stick 34 a brake 84 is provided on the shaft 80.

A track for the stick 32 is outlined by four positionable guide blocks 86 two on each side of the stick. These blocks 86 have roller bearings 88 at a slight angle which bear against the slightly indented sides of the rack 44. Positioning screws 90 on each block 86 permit adjustment of the chip stick track when necessary.

*Chip Release Mechanism*

Referring now to the detail drawings of the chip release mechanism in FIGS. 8, 8A and 8B it will be seen that the compressing of the holding rail 40 is performed by the two cam discs 42A and 42B, one on each side of the rail. Basically, the cam members, 42A and 42B are simply circular discs having rotatable shafts 90A and 90B secured slightly off center. In fact, the cam configuration causes compression or "opening" of the rail 40, with only a slight angular rotation of the cam shafts 90A and 90B, so that further slight rotation (in the same direction) then "closes" the rail. It should of course be understood that while a compressible rail 40 is described, the broader concept is the releasable engagement of a plurality of chips any one of which can be removed from the rail regardless of its position thereon.

As shown in FIG. 8, motion for the cams 42A and 42B is imparted by a motor 92 through shaft 94 to a gear train consisting of vertical beveled gears 96A and 96B, horizontal bevel gears 98A and 98B, gears 100A and 100B, and gears 102A and 102B, which are attached to the bottom of the shafts 90A and 90B respectively.

Since the gear arrangement for the two cams 42A and 42B are identical the elements of the linkages have been indicated by numerals followed by the letter "B." But it should be noted that the gear drive for cam 42B is arranged to turn that cam in the same direction as cam 42A so that the compressive forces on each side of the rail 40 which have a vector component along the rail axis tend to cancel each other out. Otherwise, if the two cams 42A and 42B turned in opposite directions, the forces acting on the rail 40 would not only cause compression but would also tend to move it in the direction of cam rotation. The four spaced roller bearings 88 (FIG. 3) forming the track for the chip stick 34 insure that the effects of cam torque on the rail 40 are minimized.

*Isolation Levers and Trap*

When the forward detection run of the chip stick or magazine 34 is stopped, the reverse or isolation run begins. The motion of the stick 34 during the isolation sequence is considerably slower by a magnitude of perhaps 20 or 50 to 1. This relatively slow coursing may actually be at a speed of, perhaps, 10 to 20 chips a second. It should also, of course, be noted that it is unlikely that the isolation run requires examination of more than a limited number, such as 10 to 20 chips 32, before the desired chip 32A is isolated.

To insure that the retrieval mechanism isolates one and only one chip 32 at a time, a sequence of isolation levers 62, 64 and 66, and a trap 68, are employed. The mechanism actuating the levers can best be seen in the details of FIGS. 5 and 6; the lever operating sequence is shown in FIGS. 9–21.

The first lever encountered by the chips 32 is the separator 62. A pivot block 104 provides the fulcrum for the separator lever 62. The stop lever 64 which is immediately adjacent the separator 62 pivots independently thereof but on the same shaft 106. A second pivot block 108 provides the fulcrum for the release lever 66. The trap 68 is spaced apart from the three isolation levers being located at a point past the reading head 54 where the chip's pivotal arc from its first oblique to its second oblique position is almost completed. The pivot point of the trap lever 68 is provided by a pivot block 110 carrying fulcrum shaft 112.

The separator and release levers 62 and 66 and the tray 68 each carry a small roller against which the respective actuating cams bear. Cam 121 operates the separator lever 62 but the separator roller cannot be seen in the figures. Cam 114 operates on the stop lever 64 directly, without abutting a roller. The release lever 66 has a roller 116 which is shown engaged by the release cam 118. The trap lever 68 is caused to pivot by cam 120 on trap roller 122.

All of the cams 121, 114, 118 and 120, are fixed to a rotatable cam shaft 124. A drive motor 126 turns the shaft 124 and the motor is disengaged from the shaft by an electrically actuated clutch 128. Rotation of the shaft 124 is stopped and hence cam motion by an electrically actuated brake 130.

Figures 5, 6:
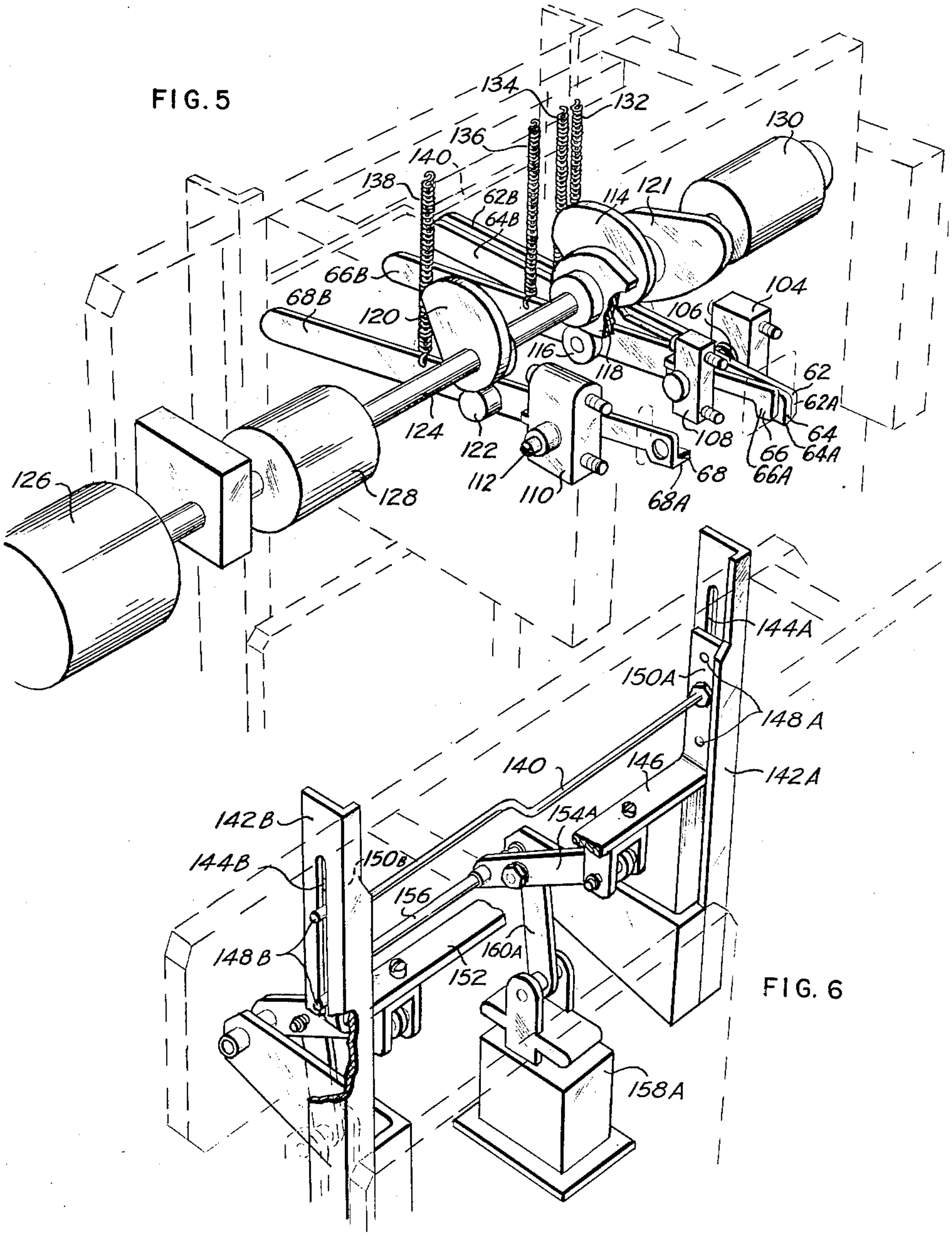
FIG. 5 is a detail, in perspective, of the operative ends of the levers which serve to isolate the desired chip, the lever operating cams driven by a shaft controlled by a motor, clutch and brake.
FIG. 6 shows the opposite or counterweight ends of the isolating levers in conjunction with a hold-down mechanism which serves to remove all levers from the path of the film stick.

As shown in FIG. 5 each of the levers 62, 64, 66, as well as the trap 68 is urged upwardly at their counterpoise ends 62B, 64B, 66B and 68B, by springs 132, 134, 136 and 138 respectively. These springs normally urge the operative ends 62A, 64A, 66A and 68A of the various levers and tray in a downward direction; the rotating cam for each lever raising the operative ends sequentially against the spring tension.

The operative portions 62A, 64A, 66A and 68A of the levers and the trap must be raised out of the way of the arcing chips 32 during the high speed detection run. This is accomplished by a hold down mechanism shown in FIG. 6. The significant element, a hold down bar 140 is indicated in phantom in FIG. 5. The hold down bar 140 is capable of limited up and down travel and is positioned to engage the non-operative or counterweight ends 62B, 64B, 66B and 68B of all the levers and the trap, pulling these ends down and thus raising the operative ends 62A, 64A, 66A and 68A out of the way of the chips 32.

Two vertical members 142A and 142B have vertically oriented slots 144A and 144B respectively. A shallow substantially U-shaped member 146 has outward protrusions 148A and 148B on each arm 150A and 150B of the U which fit the vertical slots. The base 152 of the U-shaped carriage 146 lies below the lever ends 62B, 64B, 66B and 68B while the hold-down bar 140 straddles the U between the upper parts of the arms thereof and above the ends of the levers.

Attached to the base member 152 of the carriage are the ends of two pivotally connected, spaced arms 154A and 154B (one of which is not shown in FIG. 6). The other ends of these arms are pivotally connected to a fixed shaft 156. Each of the arms 154A and 154B connects to one of the solenoids 158A and 158B respectively by linkages 160A and 160B. For clarity, solenoid 158B and linkage 160B are not shown in FIG. 6. The actuation of the solenoids 158A and 158B operates through the linkages 160A and 160B and the arms 154A and 154B to move the carriage 146 upwardly or downwardly, the hold down bar 140 engages all the lever ends 62B, 64B and 66B and the trap end 68B to move the operative ends upwardly out of the way of the chip stick 34 during detection.

*Air Heads and Positioning Mechanism*

Referring now to FIG. 7, it will be seen that the detection air jet head 56 and the isolation air jet head 60 are substantially identical except for notches 72A and 72B in the isolation head to accommodate the levers 62, 64 and 66. In each case, a tapered passage way terminates in a horn configuration opening adjacent the top edges of the chips 32. Air is provided from an air source 162 through suitable tubing 164 to electrically operated valves 166 and 168 shown in FIG. 1.

To take each air jet head 56 and 60 alternately out of the way when their functions are not directly involved either in chip detection or isolation, the heads are allowed limited movement up and down. When the detection head 56 is down in operating position, the isolation head 60 is up, and vice versa. The head movement is caused by a linkage connected to push-pull solenoids 170 and 172, the latter not being shown in FIG. 7. The linkage consists of a block 174 joined to a bar 176 connecting the two solenoids 170 and 172. This block 174 is affixed to a shaft 178 so that the lateral block motion between the solenoids is transformed into a moderate angular rotation of the shaft in either direction. At the other end of the shaft 178 is a rocker arm 180 having shafts 182 and 184 at each end; these shafts then connect to the two air heads 56 and 60 respectively. By proper adjustment of the solenoid armature travel close control is achieved over the position of both air heads simultaneously.

*Retrieval Arms*

Having located the desired chip 32A by the continuing air jet from the isolation head 60 blowing the chip against the lowered trap lever 68, the next operation is to place the chip 32A in a position to be withdrawn from its holding rail 40. This is accomplished by the two belts carrying retriever arms 70A and 70B normally positioned out of the way, just above the reading head 54.

In describing the construction (as distinct from the operation and function), of the two arms 70A and 70B in referring to arm 70A it should be understood that arm 70B is identical and carries the same reference numerals as 70A except that the letter "B" distinguishes the various parts of arm 70B.

Figure 4:
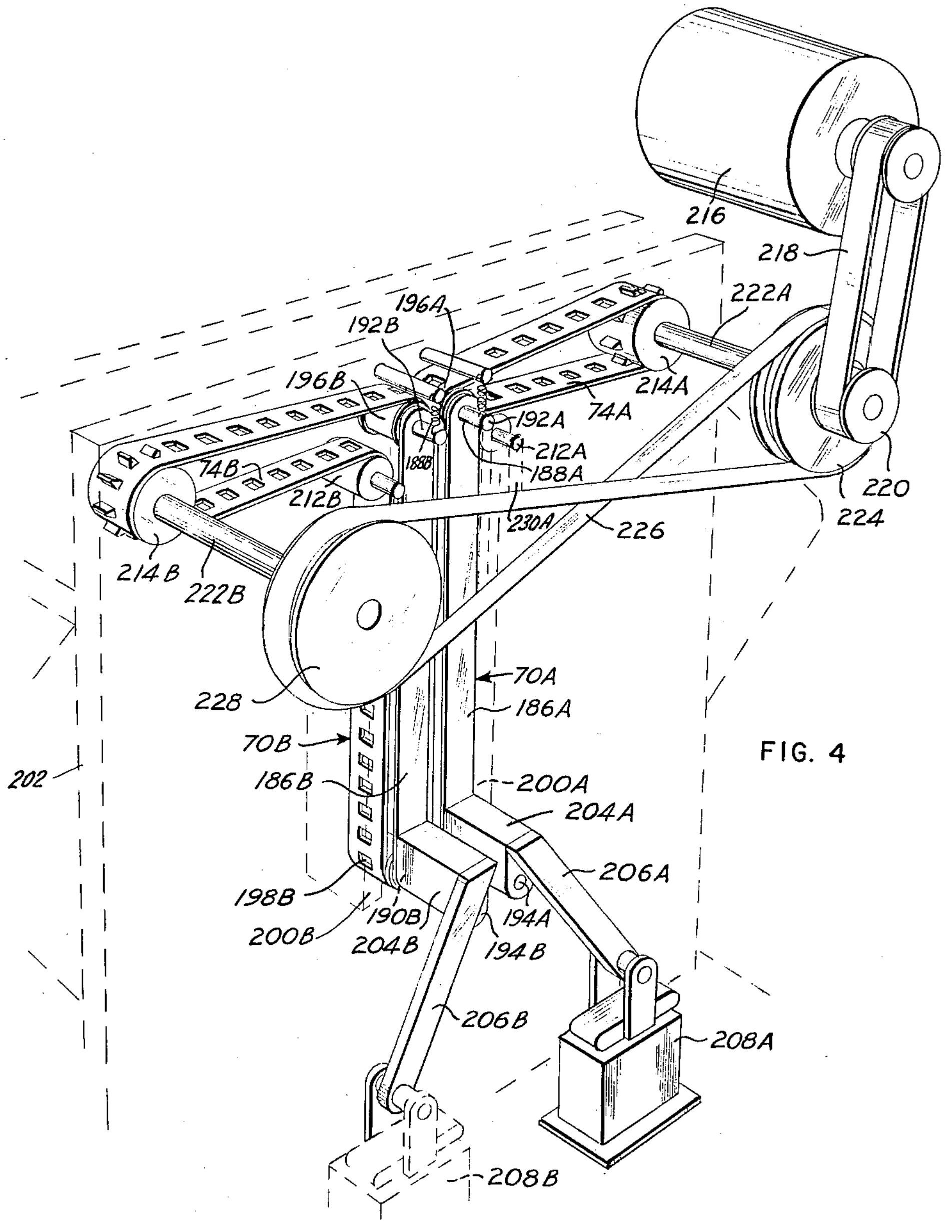
FIG. 4 shows in perspective a detail of the movable retriever arms, the positioning belts which are carried by the arms, solenoids for moving the arms, and a motor, pulley and drive belt system for moving the belts.

As shown in detail in FIG. 4, the arm 70A comprises an elongated flat bar 186A with a hole 188A near the top end and a hole 190A, not shown, near the bottom end. The bar 186A connects the shafts 192A and 194A of two rollers 196A and 198A (not shown), these shafts being slidable up and down in a slot 200A cut in an upstanding mounting plate 202. At the lower end of the bar 186A there is a protruding lug 204A to which is attached at an angle another arm 206A. The other end of each of the arms 206A and 206B is pivotally connected to solenoids 208A and 208B. Actuation of the solenoids 208A and 208B cause the retriever arms 70A and 70B to move upward or downward as required.

The endless perforated retrieval positioning belt 74A is looped, as shown in FIG. 4, over a toothed drive sprocket 214A, an idler roller 212A and the two retriever bar rollers 196A and 198A (not shown). Motion is imparted to both the endless belts 74A and 74B by a drive motor 216 coupled by a belt 218 to a pulley 220 on the shaft 222A of the drive sprocket 214A. Motion for the other belt 74B in the opposite direction is provided by a second pulley 224 on shaft 222A coupled by a crossed belt 226 to a pulley 228 on the shaft 222B of the belt drive sprocket 214B.

To allow the belt 74A to move down with the arm 70A, the idler rollers 212A and 212B are permitted limited angular travel in slots 230A and 230B in the mounting plate 202. In their normal positions the idlers 212A and 212B are prevented from sliding down the slots 230A and 230B by simple springs (not shown) which do not, however, prevent the rollers' position from accommodating to downward motion imparted to the bar 186A and the belt 74A by the solenoid 208A. This construction permits either arm 70A or 70B to move down independently of the other, and for the belts 74A and 74B to move while at the same time the arms move from their lowest to their highest positions.

*Operation*

In describing the operation of the invention 30 reference will be made initially to the block diagram of FIG.

Figure 1:
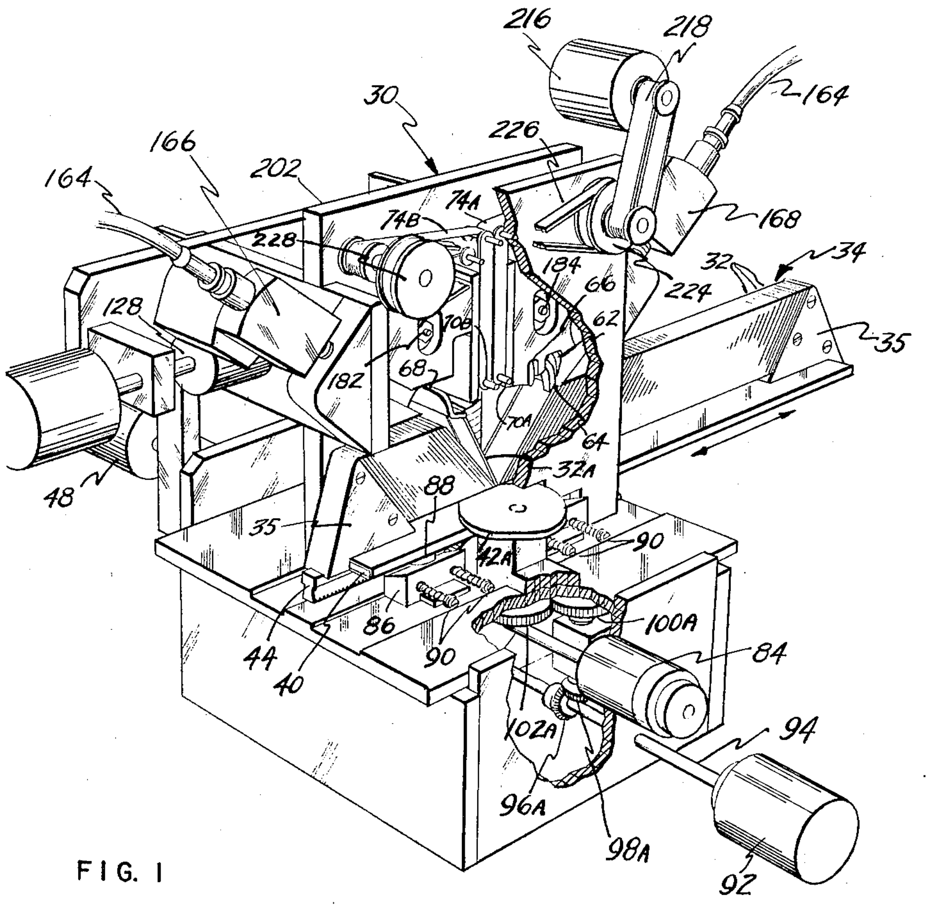
FIG. 1 is a perspective view of the data processing apparatus with a film chip magazine, herein often referred to as a "straight stick" or "chip stick" in isolation position. Parts of the apparatus are broken away to show details of the retrieval arm, air jet heads, and the magazine drive mechanism.

24 and to FIG. 1 in particular, and then to the sequence shown in FIGS. 9–23. When a particular chip 32 is desired its unique code designation is entered in the accession device 50. The accession device 50 causes an electrical signal equivalent of the chip code to be transmitted to the comparator 52 which stores the signal. To bring the system to the operating condition a standby control 232 is operated.

Through the control center 58, operation of the standby control 232 causes the following conditions to exist: The chip stick 34 is brought to one end of its track; the head positioning solenoids 170 and 172 move the detection head 56 down and the isolation head 60 up; the hold down bar 140 lowers the counterweight end 62B, 64B, 66B and 68B of the isolation levers and raises the operative ends of levers 62, 64, 66 and 68 out of the way of the chips 32; both of the retriever arms 70A and 70B are in their highest positions; air pressure is supplied to the two air heads 56 and 60 from an air supply 162 although each of the valves 166 and 168 are closed; the cam shaft clutch 128 is engaged, the brake 130 disengaged; the stick drive clutch 82 is engaged and the brake 84 disengaged.

At this point, a start switch 236 may be operated. The detection bead valve 166 opens causing an air jet to flow from the detection head 56; simultaneously the stick drive motor 48 is energized to traverse the coded chips 32 at high speed past the sensing head 54. As the chips 32 approach the head 54 the air jet from the detection head 56 directs an angular force at the top edges thereof causing a single chip at a time to pivotally arc across the head. Each chip 32 having a unique pattern of magnetic code bits on the striping thereon, provides an electrical signal equivalent to its code when each bit passes a respective transducer element on the magnetic reading bead. This signal is compared with the accession number in the comparator 52. When the desired chip 32A passes the head 54, the signal therefrom corresponds with the signal stored in the comparator 52 causing a pulse to be transmitted to the control center 58 initiating a sequence of events which eventually isolates the selected chip 32A.

The stick drive motor 48 is turned off, the drive clutch 82 is disengaged and the drive brake 84 applied. Simultaneously, the valve 166 for the detection head 56 is closed. But the velocity and mass of the stick 34 do not allow instantaneous braking so that the desired chip 32A is carried along beyond the reading head 54 and a number of chips 32 pile up on top of it. An isolation run in reverse is required.

The stick drive motor 48 is reversed but at a relatively much slower speed. At approximately the same time the brake 84 is disengaged while clutch 82 is engaged; the valve 168 for the isolation head 60 is opened causing an air jet to flow therefrom; the head positioning solenoids 170 and 172 are actuated to raise the detection head 56, and lower the isolation head 60 into its operative position; the solenoids 158A and 158B controlling the hold down bar 140 permit the counterweight ends 62B, 64B, 66B and 68B of the levers to be pulled up by the respective springs therefor; and, the drive motor 126 for the cam shaft 124 is energized and the cam shaft clutch 128 is engaged.

Reference is now made to the desired chip isolation sequence shown in FIGURES 9 to 14. In these figures the selected chip 32A is indicated by a heavier line than the others. Looking at FIG. 9 and starting at the right side of the drawing there will be seen a pile up of chips 32 being carried toward the left by the motion of stick 34. Air from the opening of the isolation head 60 causes chips 32L, 32M and 32N to hinge until impeded by the stop lever 64. At the same time a chip 32K is being blown against the trap lever 68 which is at its lowest position.

Figure 10:
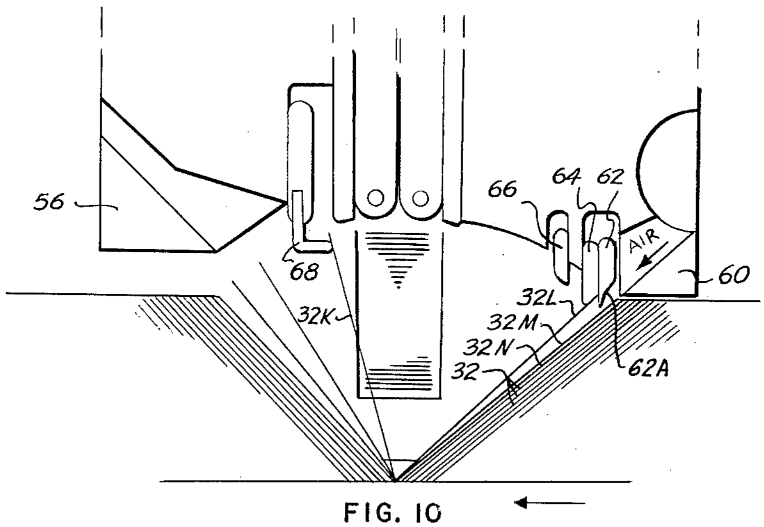

In FIG. 10 the separator lever 62 having a wedge-like profile at 62A begins to move down blocking all the chips 32M, 32N and 32 but the one 32L. A fraction of a second later, the stop lever 64 begins an upward movement, while the release lever 66 can be seen to have moved down to almost its lowest position. The trap lever 68 is about half way to its disengaged position.

Figure 11:
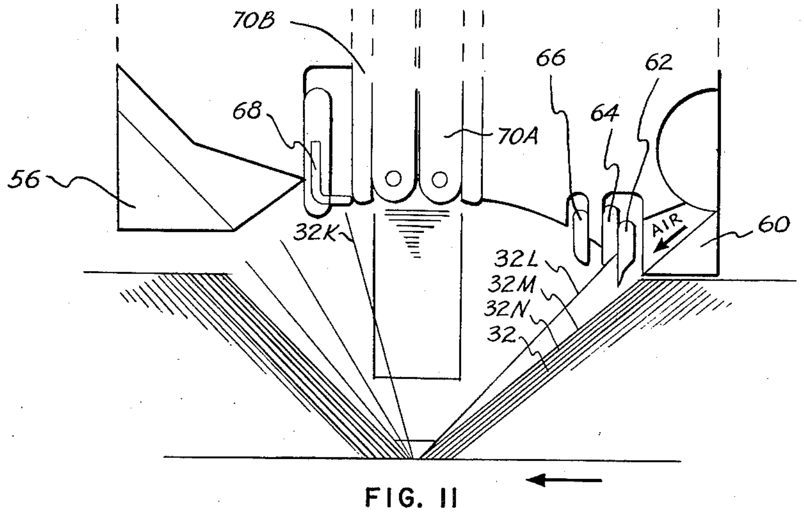

In the next figure, FIG. 11, the separator 62 has moved all the way down completely blocking the chips 32M and 32N; the stop lever 64 has almost allowed the chip 32L to continue its arc; the release lever 66 is prepared to catch chip 32L, and the trap 68 is fully raised to permit chip 32K to complete the arc to its second oblique position.

Figure 12:
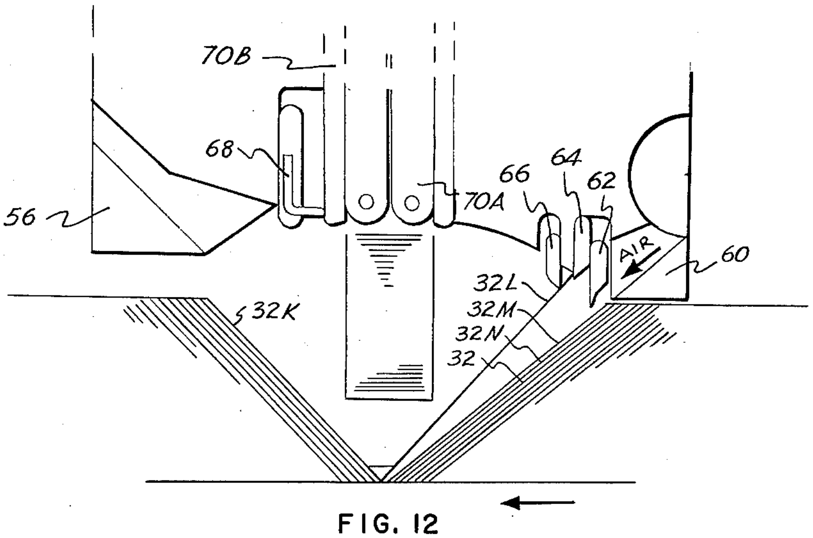
Figure 13:
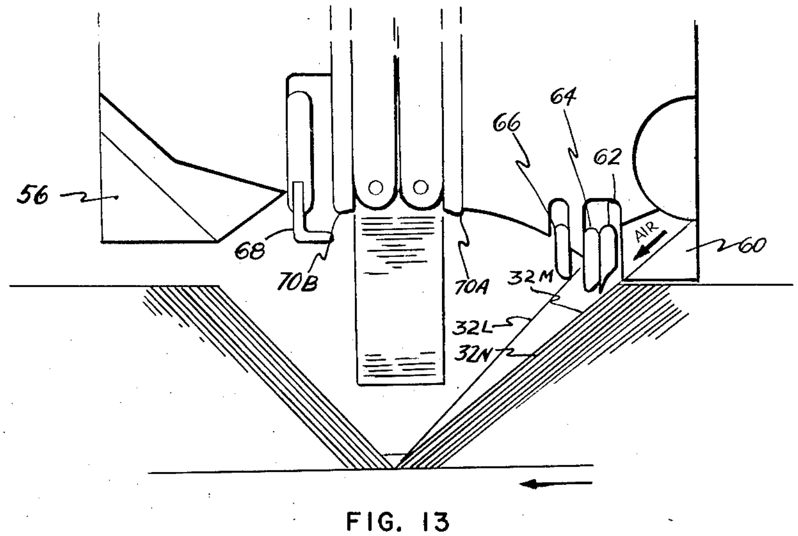
Figure 14:
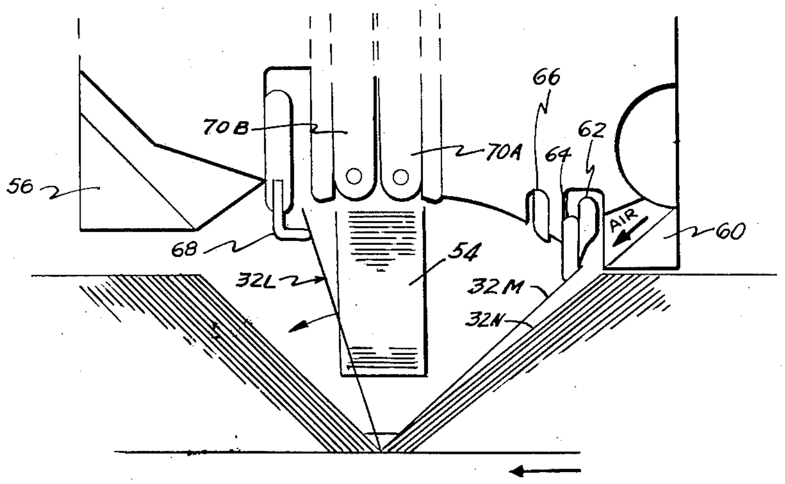

In FIG. 12, the chip 32L is now forced against the release lever 66 and remains there until the trap lever 68 as shown in FIG. 13, can be moved down to impede the chip's arc. Thus in FIG. 14 the release lever 66 moves up, the chip 32L passes the reading head 54 to be momentarily forced against the trap 68. Simultaneously, as shown in FIG. 13, the separator 62 cuts into chips 32M and 32N allowing only one chip, chip 32M to move against the stop lever 64.

Figure 15:
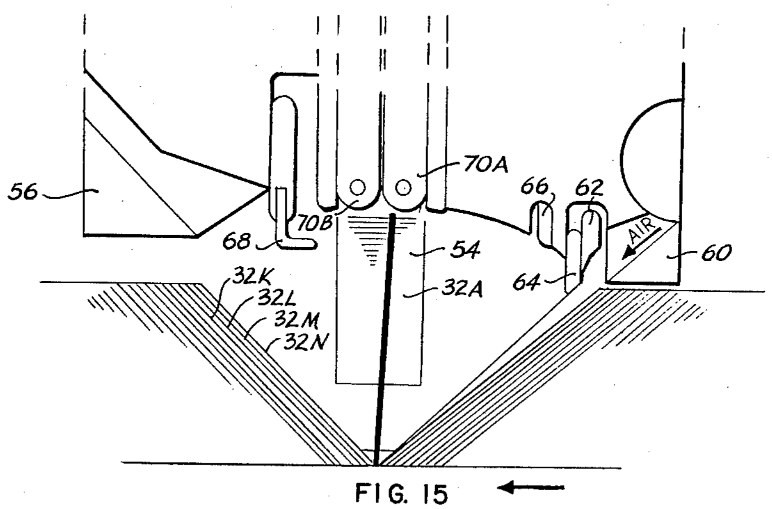
Figure 16:
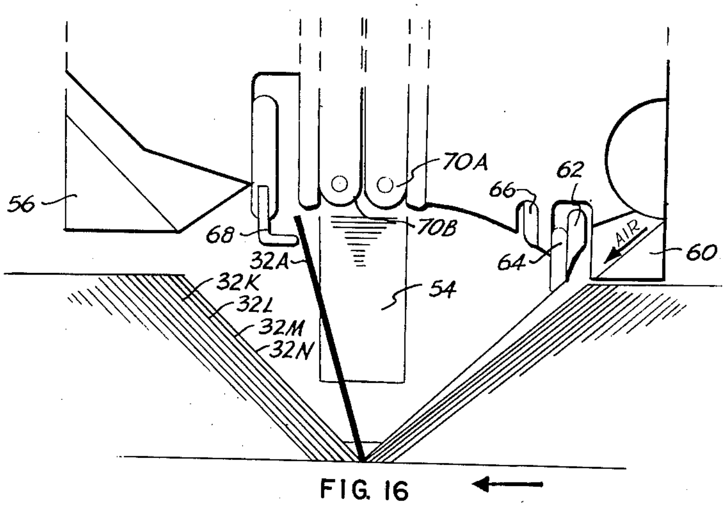
Figure 17:
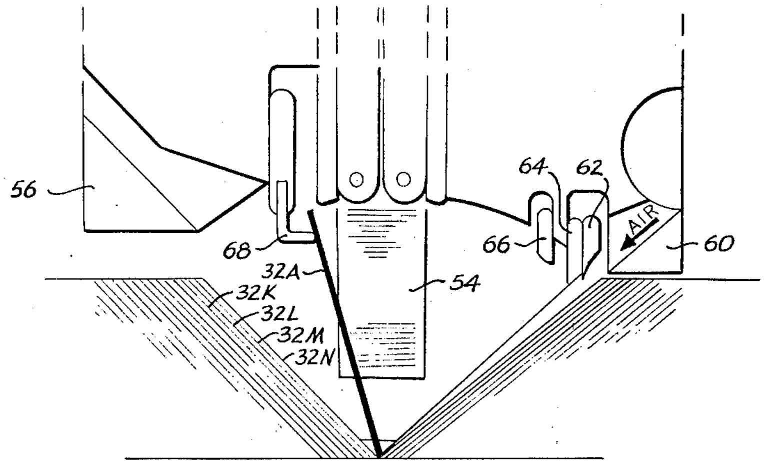

Having described the process by which each of the overshoot chips, 32K, 32L, 32M, 32N and so on is blown past the reading head 54 the sequence which follows the selected chip 32A passing the reading head a second time is as outlined below. The selected chip 32A indicated by a heavier line than the other chips 32, is shown in FIG. 15 passing the head 54. As it passes, the electrical signal output to the comparator 52 causes that circuit to transmit a pulse to the control center 58 which initiates a new sequence of control signals as follows: Drive motor 48 is de-energized, the drive shaft clutch 82 is disengaged and the drive shaft brake 84 is applied; at the same instant the cam shaft drive motor 126 is de-energized, the cam shaft clutch 128 is disengaged and the cam shaft brake 130 is applied thus initiating the stopping of the trap lever 68 in its most downward position to arrest the arc of the selected chip 32A as shown in FIG. 16. It will be noted in FIG. 17 that the three levers 62, 64, and 66 have slightly shifted positions from their situation in the previous figure, FIG. 16, although the trap lever 68 remains down. The cam 120 of the trap 68 has been arranged to accommodate to the non-instantaneous stopping of the cam shaft 124 when the selected chip 32A caused that shaft to be braked. But more significantly, the slight re-positioning of levers 62, 64, and 66 while cam shaft 124 is being braked has been taken into account so that another chip 32 cannot be allowed to accidently join the one desired, 32A against the trap, while the chip 32A is being urged against the trap 68 by the air jet from the isolation head 60, the solenoid 208A for retriever arm 70A is actuated by a pulse from the control center 52 and moves down behind chip 32A as shown in FIG. 18. Then the valve 168 controlling the air from the isolation head 60 is closed, while the valve 166 to the detection head 56 is opened, the ensuing air jet blowing the chip 32A against the retriever arm 70A indicated in FIG. 19.

Figure 20:
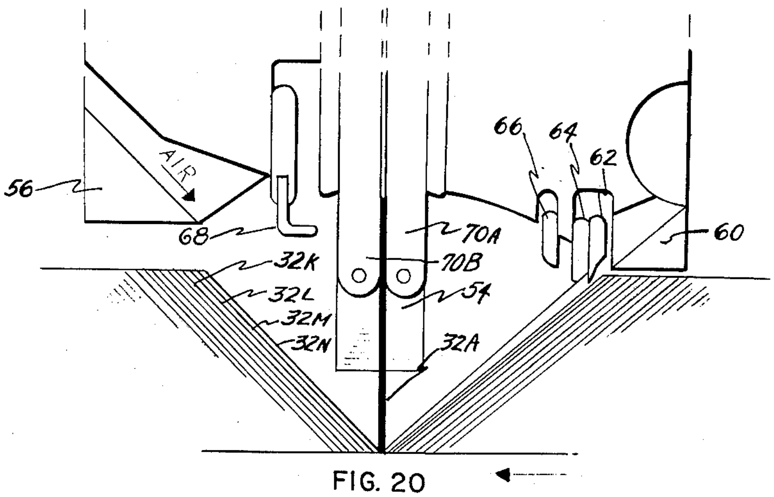

While the detection air jet forces the chip 32A against the retriever arm 70A the other retriever arm 70B is brought down to the other side of the chip as shown in FIG. 20. Now the chip 32A is firmly but gently enclosed between the two endless belts 74A and 74B carried by the two bars 186A and 186B respectively.

Figure 21:
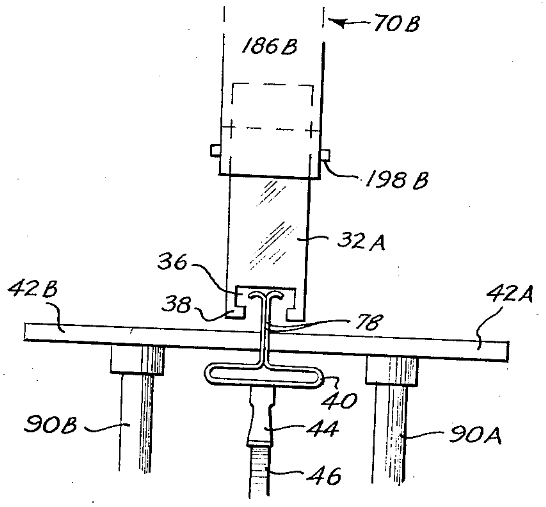
Figure 22:
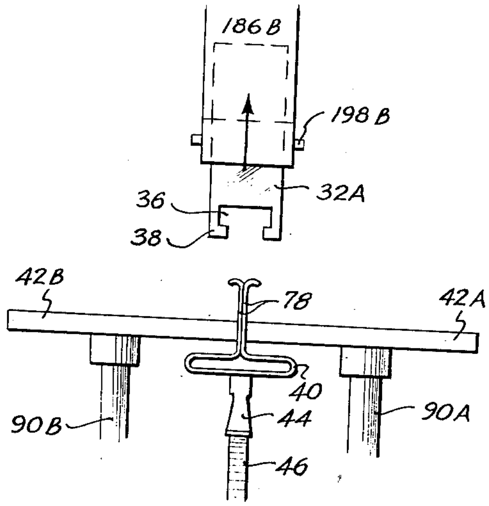
Figure 23:
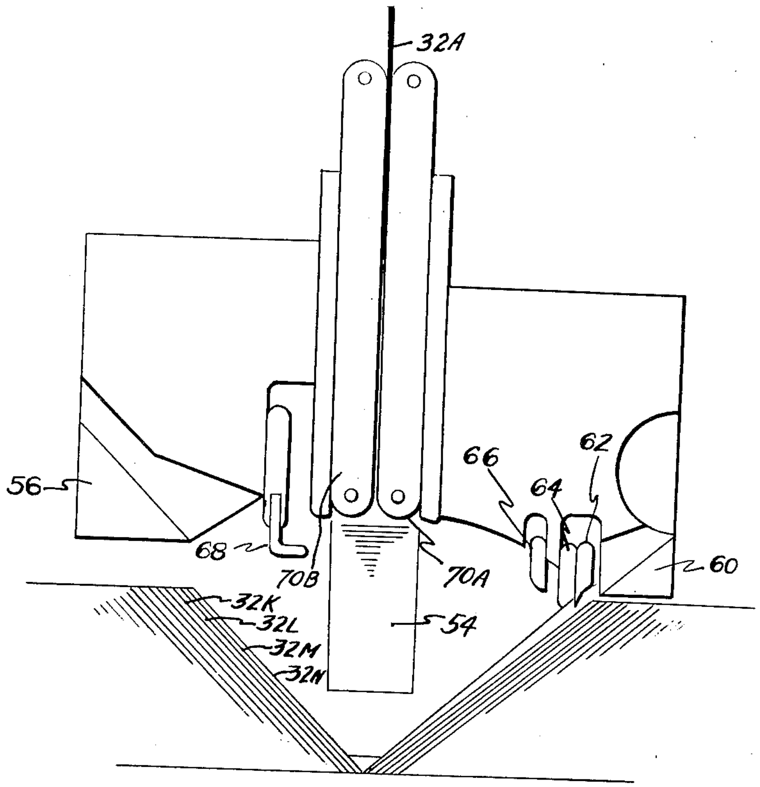

At this instant, the control center 52 energizes the squeeze cam motor drive 92 which brings the two cams 42A and 42B into engagement with the holding rail 40 as will be seen in FIG. 21. As shown in FIG. 22, when the rail 40 is compressed sufficiently by the action of the cams 42A and 42B (see FIG. 8B) the drive motor 216 for the endless belts 74A and 74B is energized to carry the chip 32A up between the belts to the top of the arms 70A and 70B. Simultaneously the two solenoids 208A and 208B are actuated, raising the arms 70A and 70B back to their normal positions and bringing the selected chip 32A up to the top of the apparatus 30 where it thus becomes available for whatever purposes are desired, display, reproduction, correction, removal, and the like. This final series of operations is illustrated in the last two figures of the sequence FIGS. 22 and 23.

It is evident that numerous modifications of and departures from the specific apparatus described herein may be practiced by those skilled in the art without departing from the inventive concepts. For example, in the foregoing description the term film chip has been employed throughout. It is clear however, that any data bearing sheet, photographic or otherwise, is capable of being handled in a similar fashion. Horeover, while magnetic coding and detection are described, other techniques such as photoelectric sensing of appropriately coded data sheets are equally feasible. Again, a compressible holding rail has been utilized in conjunction with cams for compressing the rail; obviously a compressive effect on a suitably constructed holding means may be accomplished by tension forces. Consequently, the invention is to be construed as limited only by the spirit and scope of the appended claims.

What is claimed is:

1. Data processing apparatus for selecting one particular data bearing sheet from an arrangement of a plurality of physically similar sheets comprising, means for releasably holding said sheets in said arrangement, means for isolating on said holding means said particular sheet from said plurality of sheets, means cooperatively associated with said holding means for releasing said isolated particular sheet from said holding means, and means for removing said isolated and released sheet from said holding means.

2. Data processing apparatus in accordance with claim 1 wherein said holding means comprises a rail of adjustable configuration, each of said sheets being formed with means for engaging said rail, said last mentioned means being adapted to retain the respective sheet secure upon said rail with the latter in a first configuration and to permit release of the respective sheet when in a second configuration, said releasing means being arranged to adjust said rail from said first to said second configuration.

3. Data processing apparatus in accordance with claim 2 wherein said rail is compressible when in said first configuration, said releasing means being adapted to compress said rail into said second configuration.

4. Data processing apparatus in accordance with claim 3 wherein said rail is selectively compressible along its lengthwise dimension, said releasing means being operative to compress said rail in the region of said isolated particular sheet.

5. Data processing apparatus for retrieving a particular film chip from a plurality of physically similar film chips, a holding rail, said film chips being slidably and pivotally mounted in closely adjacent relation on said holding rail, rail engaging means adapted upon operation to selectively release said particular chip from said holding rail, means for isolating said particular chip from said plurality thereof, means engaging said isolated chip and co-acting with operation of said rail engaging means for removing said particular chip from said rail.

6. Data processing apparatus according to claim 5 wherein said isolating means comprises a plurality of stop means releasably engaging said chip edges one at a time in a predetermined sequence, the last of said stop means to engage said chips being arranged to remain in engagement with said particular chip.

7. Data processing apparatus in accordance with claim 5, said isolating means comprising air jet means for pivoting said chips, and a plurality of chip intercepting and separating elements coacting in a predetermined sequence with said air jet means to separate adjacent pivoting chips.

8. Data processing apparatus in accordance with claim 7, said chip intercepting and separating elements comprising a first, second and third lever, each having an independent raised and lowered position, said air jet means causing said chips to pivot into said lowered levers from a first oblique position near said first lever to a second oblique position near said third lever, a gate disposed in said pivotal path of said chips for releasably blocking said chips, means for lowering and raising said levers in predetermined sequence whereby raising said third intercepting lever permits only one chip at a time to be blocked by said gate.

9. Data processing apparatus in accordance with claim 8 including means engaging said levers for raising all of said levers and said gate simultaneously out of the path of said chips.

10. Data processing apparatus for detecting and isolating a desired coded date sheet from a plurality of coded data sheets mounted on a rail in a manner permitting detachment therefrom when said rail is compressed, said apparatus comprising: code sensing means disposed in a scanning area, means for moving said rail to cause said data sheets to move past said code sensing means, air jet means for causing said sheets to pivot about said rail and be blown past said code sensing means, a plurality of sequentially actuated chip separating elements, means for moving said elements in a predetermined sequence to cause one sheet at a time to enter said scanning area, a gate for catching each successive sheet in the scanning area after said sheet has been scanned by said code sensing means, means for releasing said gate when the scanned sheet is not the one desired.

11. Data processing apparatus in accordance with claim 10 further including means for removing said desired sheet from said rail upon detachment therefrom, said removing means comprising sheet engaging means having a first retracted position and a second position operatively disposed adjacent said gate for engaging a sheet caught by said gate, and means for actuating said sheet engaging means when said desired sheet is caught by said gate.

12. Data processing apparatus in accordance with claim 11, said air jet means comprising first and second air jet means, said first air jet means arranged in operative relation with said sheet separating elements whereby each air blown pivoting chip is positively separated from the sheet immediately adjacent thereto, said second air jet means disposed in cooperative relation with said sheet engaging means.

13. Data processing apparatus in accordance with claim 12 further including a sheet removal mechanism, said mechanism comprising first and second cooperating sheet removing elements, said elements each having a retracted position and an operative position, said second air jet means arranged to blow said desired sheet away from said gate, said first element having said operative position at a point intercepting said desired sheet when blown by said second air jet, said second remaining element having its operative position between said second air jet means and said desired sheet, and means for actuating said first and second sheet removal means to cooperatively remove said sheet from said operative to said retracted position.

14. Data processing apparatus comprising the combination of, means for selecting and isolating a desired data sheet from an arrangement of data sheets mounted on a rail, said data sheets being mounted on said rail in a manner permitting each of said sheets to pivot about said rail, said rail having a pair of flanges held apart by resilient means, each of said data sheets having a cutout for receiving said flanges to retain said sheet on said rail and permitting said sheet to be dismounted from said rail when said flanges are moved together, means for moving said flanges together operatively disposed along said rail, means for traversing said rail in a track, means for stopping said rail when the desired sheet has been isolated, driving apparatus for causing said flange moving means to compress said rail, means for actuating said driving apparatus when said desired sheet has been isolated, and means for removing said desired sheet from said rail.

15. Data processing apparatus in accordance with claim 14, said flange moving means comprising eccentric cams on each side of said rail track adjacent said desired sheet, said cam driving apparatus arranged to rotate said cams in the same direction whereby the vector component of each force co-axial with said track bears in opposite directions on each side of said rail.

16. Data processing apparatus in accordance with claim 15 further including a first and second air jet means arranged in opposed angular disposition with the edges of said sheets for pivoting same on said rail, means adjacent said rail track cooperating with said first air jet for separating said desired sheet from the arrangement thereof on said rail, said second air jet means arranged in cooperative relation with said means for removing said desired sheet from said rail.

17. Data processing apparatus in accordance with claim 16 said isolating means adjacent said rail track comprising a plurality of elements along said rail track disposed for sequentially separating, releasing and intercepting said sheets as said first air jet causes said sheets to pivot on said rail, means for stopping said isolating means before said desired sheet is released from the last element thereof, said second air jet further arranged to co-act with said last separating element for positioning said sheet in cooperation with said sheet removing means.

18. Data processing apparatus in accordance with claim 17, said elements comprising a plurality of pivoted levers, said levers being operated in sequence by cams mounted on a shaft, said shaft having a drive motor, clutch and brake thereon, means connected to said motor, clutch and brake responsive to a unique code on said desired sheet for controlling shaft rotation, said sheet removing means comprising a first and second arm having moving belts thereon, said arms being disposed in a position between said intercepting element and releasing element, each of said arms being capable of moving independently from a retracted position to an operative position in the pivotal arc of said sheets, said first arm having means for moving same to said operative position, said second air jet blowing said desired chip against said first arm in operative position, said second arm having means making it adjacent said first arm when both are in operative position thereby engaging said sheet, means for moving said belts in opposite directions whereby said sheet moves up between said belts.

19. A data processing apparatus for selecting one particular data bearing sheet from an arrangement of a plurality of physically similar sheets comprising, means of adjustable configuration for releasably holding said sheets in said arrangement, means for isolating on said holding means said particular sheet from said plurality of sheets, means cooperatively associated with said holding means for altering the configuration of said holding means thereby releasing said isolated particular sheet from said holding means, and means for removing said isolated and released sheet from said holding means.

20. A data processing apparatus in accordance with claim 19 and including further means for restoring said holding means to its initial configuration after removal of said isolated and released sheet.

21. A data processing apparatus for selecting one particular data bearing sheet from an arrangement of a plurality of physically similar sheets each being formed with a coupling portion, comprising, holding means of adjustable configuration releasably engaging said coupling portion of each of said sheets for releasably holding said sheets in said arrangement, means for isolating on said holding means said particular sheet from said plurality of sheets, means cooperatively associated with said holding means for altering the configuration of said holding means to disengage the coupling portion of said isolated particular sheet from said holding means, and means for removing said isolated and released sheet from said holding means.

References Cited in the file of this patent

UNITED STATES PATENTS

| | | |
|---|---|---|
| 2,195,845 | Wilson | Apr. 2, 1940 |
| 2,644,458 | Meagher | July 7, 1953 |